United States Patent [19]

Fukami et al.

[11] Patent Number: 4,812,924
[45] Date of Patent: Mar. 14, 1989

[54] METHOD AND APPARATUS FOR REPRODUCING OR RECORDING A PCM SIGNAL AND SUB DATA CONCERNING THE PCM SIGNAL IN A PAIRED FORMAT

[75] Inventors: Tadashi Fukami; Shinya Ozaki, both of Kanagawa; Kentaro Odaka, Tokyo, all of Japan

[73] Assignee: Sony Corporation, Tokyo, Japan

[21] Appl. No.: 23,479

[22] Filed: Mar. 9, 1987

[30] Foreign Application Priority Data

Mar. 11, 1986 [JP] Japan ................. 61-52943

[51] Int. Cl.$^4$ ............................................. G11B 20/10
[52] U.S. Cl. ....................................... 360/32; 360/48; 371/38
[58] Field of Search .............. 360/32, 48, 27, 18, 360/19.1; 371/38, 39, 40

[56] References Cited

U.S. PATENT DOCUMENTS

| | | | |
|---|---|---|---|
| 3,975,761 | 8/1976 | Taudt et al. | 360/32 |
| 4,306,305 | 12/1981 | Doi et al. | 371/38 |
| 4,477,844 | 10/1984 | Nakano et al. | 360/19.1 |
| 4,604,657 | 8/1986 | Fukami et al. | 360/32 |
| 4,620,238 | 10/1986 | Goskell et al. | 360/32 |
| 4,660,103 | 4/1987 | Wilkinson et al. | 360/18 |
| 4,670,796 | 6/1987 | Kobayashi et al. | 360/19.1 |
| 4,682,245 | 7/1987 | Shibata et al. | 360/19.1 |

Primary Examiner—Alan Faber
Assistant Examiner—Kevin J. Fournier
Attorney, Agent, or Firm—Philip M. Shaw, Jr.

[57] ABSTRACT

A rotary head type digital tape recorder in which a PCM signal and sub data for control and the like concerned with the PCM signal are recorded and/or reproduced by rotary heads. The invention relates to a method and apparatus for transmitting and/or receiving a digital signal in such a type of digital tape recorder by using a data format such that when the serial data is input and output each of a predetermined number of words of the reproduced PCM signal and each symbol of the reproduced sub data are transmitted as a pair synchronously with the rotation of the rotary heads. Thus, a large amount of sub data can be input and output together with the PCM signal.

10 Claims, 7 Drawing Sheets

| BLOCK ADDRESS | 8 BITS → | | | | | | |
|---|---|---|---|---|---|---|---|
| 0 | S1 | S2 | S3 | ---------------- | S31 | S32 | |
| 1 | S33 | S34 | S35 | ---------- S55 | S56 | C1-P | |
| 2 | S57 | S58 | S59 | ---------------- | S87 | S88 | |
| 3 | S89 | S90 | S91 | ---------- S111 | S112 | C1-P | SUB CODE 1 |
| 4 | S113 | S114 | | ---------------- | S143 | S144 | |
| 5 | S145 | S146 | | ---------- S167 | S168 | C1-P | |
| 6 | S169 | S170 | | ---------------- | S199 | S200 | |
| 7 | S201 | S202 | | ---------- S223 | S224 | C1-P | |
| 8 | S225 | S226 | | ---------------- | S255 | S256 | |
| 9 | S257 | S258 | | ---------- S279 | S280 | C1-P | |
| A | S281 | S282 | | ---------------- | S311 | S312 | SUB CODE 2 |
| B | S313 | S314 | | ---------- S335 | S336 | C1-P | |
| C | S337 | S338 | | ---------------- | S367 | S368 | |
| D | S369 | S370 | | ---------- S391 | S392 | C1-P | |
| E | S393 | S394 | S395 | ---------------- | S423 | S424 | |
| F | S425 | S426 | S427 | ---------- S447 | S448 | C1-P | |

|← 32 SYMBOLS →|←8 SYMBOLS→|

Fig. 9

| W1 | W2 | BLOCK ADDRESS |
|---|---|---|
| S465 | S466 | 0 x x 0 |
| S467 | S468 | 0 x x 1 |
| S469 | S470 | 1 x x 0 |
| S471 | S472 | 1 x x 1 |
| 8 BITS | 8 BITS | |

Fig. 10

| W1 | BLOCK ADDRESS |
|---|---|
| S449 | x x x 0 0 0 0 |
| S450 | x x x 0 0 0 1 |
| S451 | x x x 0 0 1 0 |
| S452 | x x x 0 0 1 1 |
| S453 | x x x 0 1 0 0 |
| S454 | x x x 0 1 0 1 |
| S455 | x x x 0 1 1 0 |
| S456 | x x x 0 1 1 1 |
| S458 | x x x 1 0 0 1 |
| S460 | x x x 1 0 1 1 |
| S462 | x x x 1 1 0 1 |
| S464 | x x x 1 1 1 1 |
| 8 BITS | |

METHOD AND APPARATUS FOR REPRODUCING OR RECORDING A PCM SIGNAL AND SUB DATA CONCERNING THE PCM SIGNAL IN A PAIRED FORMAT

FIELD OF THE INVENTION

The present invention relates to a digital tape recorder and, more particularly, to a method and apparatus for transmitting and/or receiving a digital signal in a rotary head type digital tape recorder.

DESCRIPTION OF RELATED BACKGROUND ART

There has been proposed a rotary head type digital tape recorder for recording/reproducing a digital audio signal (PCM signal) by a pair of rotary heads. In such a digital tape recorder, sub codes such as the program number, the time code, and the like are recorded. In addition, PCM-IDs for identifying the sampling frequency, the number of channels, and the number of digitization bits of the PCM signal, the presence or absence of preemphasis, the characteristic thereof, and the like are recorded together with the PCM signal.

In the proposed digital tape recorder, the PCM signal can be input and output in the form of serial data in order to be able to supply an analog audio signal as the recording input signal, to obtain an analog audio signal as the reproduction output signal, and to make it possible to easily digitally couple with other PCM apparatuses such as other digital tape recorders, digital mixers, and the like. In this case, it is necessary to transmit the sub data together with the PCM signal. Several formats have been proposed by EBU, Philips, and others as standards for the PCM signal transmitting systems. According to the format of EBU, the auxiliary bits of four bits and the user data of one bit for the sub code of the compact disc are assigned to one audio sample data. According to the format of Philips, the PCM signal and the other data are multiplexed when transmitted and received.

In the case of the proposed rotary head type digital tape recorder, there is a large amount of sub data of the sub codes and PCM-ID. Therefore, the sub data cannot be transmitted by any of these conventional PCM signal transmitting systems.

SUMMARY OF THE INVENTION

It is, therefore, an object of the present invention to provide a method and apparatus for transmitting and/or receiving a digital signal in a rotary head type digital tape recorder in which a large amount of sub data can be input and output together with the PCM signal as compared with a compact disc or the like.

According to the invention, there is provided a method and apparatus for transmitting and/or receiving a digital signal in a rotary head type digital tape recorder in which a PCM signal and sub data relating to control and the like of the PCM signal are recorded or reproduced together by rotary heads. Serial data, with each symbol of the sub data and every word of the PCM signal being transmitted as a pair, can be input and output for the period of time corresponding to a predetermined number of symbols in the pulse signal which are synchronized with the rotation of the rotary heads.

The recording data or reproduced data input or output with respect to the rotary heads is transmitted as serial data for a predetermined period of time which is equal to the scanning interval of the rotary heads. For the period of time corresponding to a predetermined number of words (472 words) within the foregoing predetermined period of time, each symbol (eight bits) of the sub data is transmitted as a pair with each word (sixteen bits) of the PCM signal. Therefore, the 472 symbols can be input and output as serial data together with the PCM signal.

The above and other objects and features of the present invention will become apparent from the following detailed description and the appended claims with reference to the accompanying drawings.

DESCRIPTION OF THE PREFERRED EMBODIMENT

Figure 1:
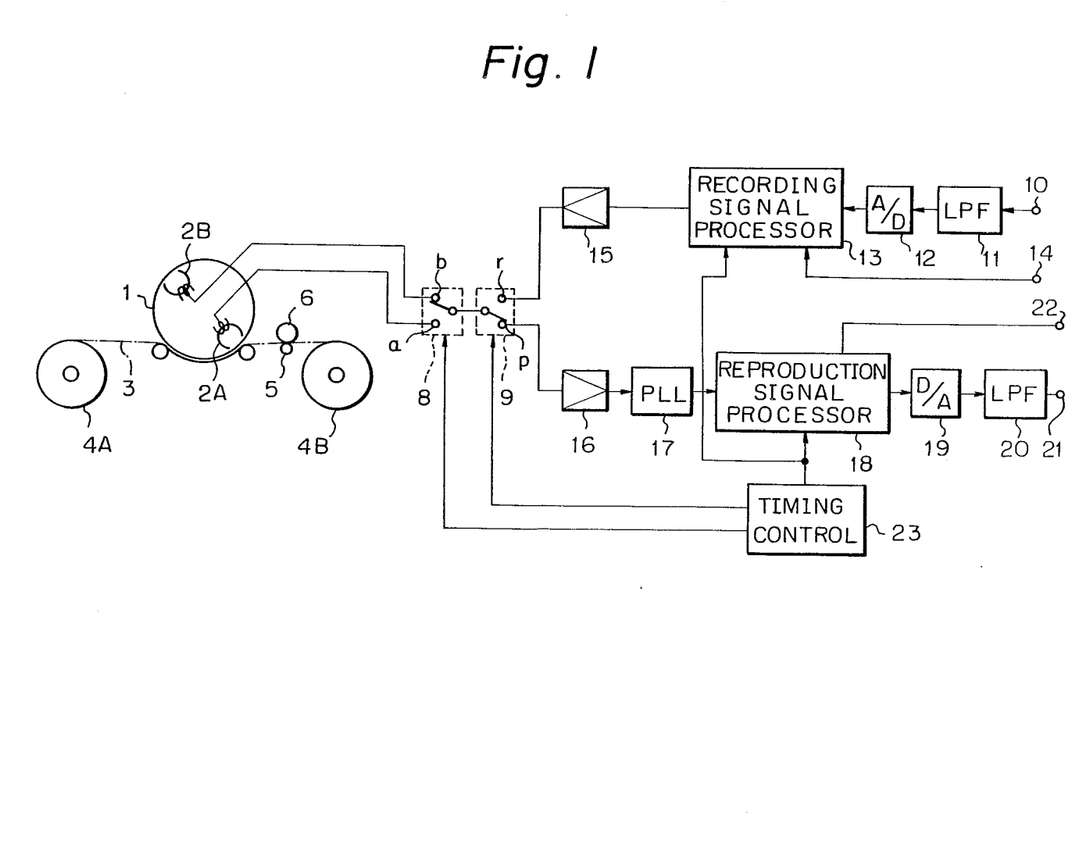
FIG. 1 is a block diagram showing an overall constitution of a rotary head type digital tape recorder to which the present invention can be applied.

An embodiment when the present invention is applied to a rotary head type digital tape recorder (hereinafter, abbreviated to an RDAT) will be described in detail hereinbelow with reference to the drawings in accordance with the following order.

a. Overall constitution of a digital tape recorder;
b. Data constitution of a digital tape recorder;
c. Error correction codes of a digital tape recorder;
d. Recording signal processor and reproduction signal processor according to the present invention; and
e. Data transferring system according to the present invention.

a. Overall constitution of a digital tape recorder:

FIG. 1 shows an overall constitution of a rotary head type digital tape recorder (i.e., RDAT) for use with the present invention. In the diagram, reference numeral 1 denotes a drum having a diameter of 30 mm which is rotated at a speed of 2000 r.p.m. A pair of magnetic heads 2A and 2B are attached to the drum 1 with an angular interval of 180°. A magnetic tape 3 (indicated by an alternate long and short dash line) is obliquely wound around the peripheral surface of the drum 1 at a wrap angle of 90°. The magnetic tape 3 is laid between reel hubs 4A and 4B of a tape cassette and is moved at a speed of 8.15 mm/sec by a capstan 5 and a pinch roller 6.

Figure 2:
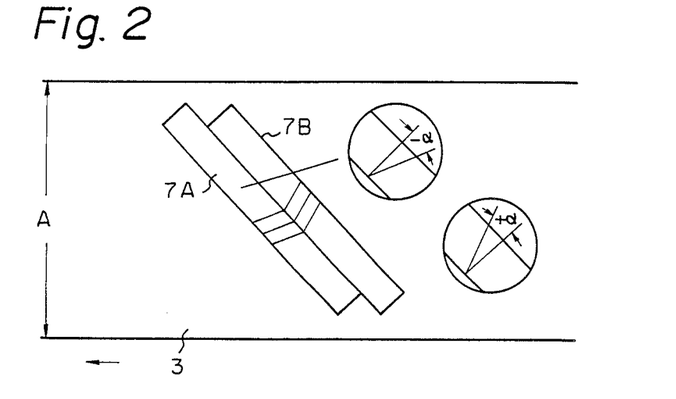
FIG. 2 is a schematic diagram showing a tape format of the digital tape recorder.

As the drum 1 is rotated, the magnetic heads 2A and 2B alternately come into contact with the magnetic tape 3, thereby forming oblique tracks 7A and 7B onto the magnetic tape 3 as shown in FIG. 2. A tape width A of the magnetic tape 3 is 3.81 mm. The magnetic gap of the rotary head 2A is inclined by an angle of inclination of +α with respect to the direction perpendicular to the track. The magnetic gap of the other rotary head 2B is inclined by an angle of inclination of −α with regard to the direction perpendicular to the track. The value of α is set to 20°. The angles of the magnetic gaps of the magnetic heads 2A and 2B are called +azimuth and −azimuth, respectively.

The magnetic heads 2A and 2B are alternately selected by a head change-over switch 8. The recording signal from a terminal r of a recording/reproducing switch 9 is supplied to the magnetic heads 2A and 2B through rotary transformers (not shown). The reproduced signals of the magnetic heads 2A and 2B are taken out to a terminal p of the switch 9 through the rotary transformers (not shown).

The analog audio signal from an input terminal 10 is supplied to an A/D converter 12 through a low pass filter 11 and converted into a digital audio signal (at a sampling frequency of 48 kHz on the basis of a linear digitization of 16 bits). The digital audio signal from the A/D converter 12 is supplied to a recording signal processor 13. In the processor 13, the digital audio signal is subjected to an error correction coding process and converted into the format of the recording data, which will be explained hereinafter. In this case, an ID signal (PCM-ID) to identify the on/off of the preemphasis of the signal to be recorded, the sampling frequency, the number of digitization bits, and the like is added. The sub codes such as the program number, the time code, and the like of the signal to be recorded, and an ID signal (sub code ID) for the sub codes are formed by a sub code encoder (not shown) and supplied from a terminal 14 to the recording signal processor 13.

Serial recording data for each track is generated from the processor 13 synchronously with the rotation of the magnetic heads 2A and 2B. The recording data is supplied to the head change-over switch 8 through a recording amplifier 15 and the terminal r of the recording/reproducing switch 9. The recording data is alternately supplied to the magnetic heads 2A and 2B by the switch 8.

During reproduction, the signals reproduced by the magnetic heads 2A and 2B are supplied to a reproducing amplifier 16 through the switch 8 and through a terminal p of the switch 9. The output signal of the reproducing amplifier 16 is supplied to a phase locked loop (PLL) 17. In the PLL 17, the clock signal synchronized with the reproduced signal is extracted. In a reproduction signal processor 18, the reproduced signal from the PLL 17 is subjected to the processes of error correction, interpolation, and the like. The reproduced digital audio signal is supplied to a D/A converter 19. The reproduced audio signal from the D/A converter 19 is taken out to an output terminal 21 through a low pass filter 20. Further, the sub codes and sub code ID are separated by the reproduction signal processor 18 and taken out to an output terminal 22. A sub code decoder (not shown) is connected to the output terminal 22 and control data and the like are formed from the sub codes.

Figures 3A, 3B, 3D:
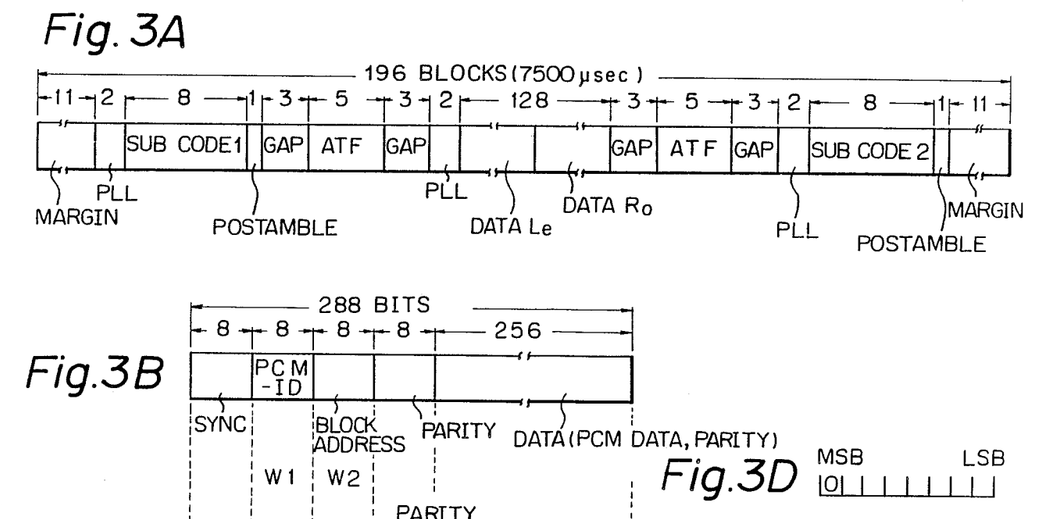
FIGS. 3A to 3E are schematic diagrams for explaining a track format and a block format of the digital tape recorder.

Control signals to control the head change-over switch 8 and recording/reproducing change-over switch 9 are formed by a timing controller 23 from a PG pulse indicative of the rotation of the heads. In addition, the timing controller 23 generates clock signals and timing signals which are respectively necessary for the recording signal processor 13 and reproduction signal processor 18 using the clock signal, block sync signal, and the like from the PLL 17.

b. Data constitution of a digital tape recorder:

The whole part of the data to be recorded in a single track is called one segment. FIG. 3A shows a constitution of the data of one segment which is recorded by one rotary magnetic head. Assuming that a unit amount of the recording data is one block, the data of 196 blocks (7500 μsec) is included in one segment. Margins (eleven blocks) are provided in both end portions of one segment corresponding to the edge portions of the track, respectively. A sub code 1 and a sub code 2 are recorded in the portions adjacent to those margins, respectively. These two sub codes are the same data and this data is recorded twice. The sub code includes the program number and time code. A run-in interval (two blocks) of the PLL and a postamble interval (one block) are arranged on both sides of the recording area of eight blocks of each sub code.

Several inter block gaps (GAP) in which no data is recorded for three blocks are also provided. A pilot signal for the ATF is recorded in five blocks between the 3-block inter block gaps. The PCM signal which was subjected to the recording process is recorded in an area having a length of 128 blocks, i.e., excluding the run-in interval of the PLL of two blocks within an area having a length of 130 blocks of the central portion of one segment and between inter block gaps (GAP). This recorded PCM signal is the data corresponding to the audio signal for the period of time when the rotary head rotates by only the amount corresponding to a half rotation of the drum 1.

The recorded PCM signal consists of the two-channel stereophonic PCM signals of right (R) and left (L) channels and the parity data of the error detection/correction codes. When one segment as shown in FIG. 3A is recorded and reproduced by the magnetic head 2A, the data Le is recorded in the left half portion of the PCM signal recording area and the data Ro is recorded in the right half portion. The data Le consists of the even-number designated data of the L channel and the parity data regarding this data. The data Ro consists of the odd-number designated data of the R channel and the parity data concerned with this data. The odd number and even number are the order numbers when they are counted from the beginning of the interleave block.

The data of one segment is recorded in another track which is formed by the other rotary magnetic head so as to have the same constitution as that of the above described track except that the data Re is recorded in the left half portion of the data interval in the data of one segment in the other track, and the data Lo is recorded in the right half portion. The data Re consists of the even-number designated data of the R channel and the parity data regarding this data. The data Lo consists of the odd-number designated data of the L channel and the parity data with respect to this data. In this manner, the even-number designated data and odd-number designated data of each channel are recorded in two adjacent tracks and, at the same time, the data of the L and R channels is recorded in the same track. The reason why the data is recorded in this way is to prevent the possibility that continuous data of the same channel might become error data due to dropout of the signal and the like.

FIG. 3B shows a data constitution of one block of the PCM signal. A block sync signal of eight bits (one symbol) is added to the head of one block. Then, a PCM-ID of eight bits is added. After the PCM-ID, a block address is added. A simple parity error correction coding process is performed with respect to two symbols ($W_1$ and $W_2$) of the PCM-ID and block address. An eight-bit parity is added after the block address. As shown in FIG. 3D, the block address is constituted by seven bits excluding the most significant bit (MSB). When tee MSB is set to "0", this means that this block is the PCM block.

The block address of seven bits sequentially changes such as (00) to (7F) (hexadecimal notation). The PCM-ID which is recorded into each block having the block address whose lower three bits are (000), (010), (100), or (110) is preliminarily determined. The optional code of the PCM-ID can be recorded as each block address whose lower three bits are (001), (011), (101), or (111). $ID_1$ to $ID_8$ each consisting of two bits and the frame address of four bits are included in the PCM-ID. The identification information is defined for each of the $ID_1$ to $ID_7$. One pack is constituted by thirty-two $ID_8$. For example, the $ID_1$ is the format ID and the kind of application for audio use or other use is identified by the $ID_1$. The on/off of the preemphasis and the characteristic of the preemphasis are identified by the $ID_2$. The sampling frequency is identified by the $ID_3$. The foregoing $ID_1$ to $ID_7$ and the frame address have the same data in the segments of the interleave pair.

Figures 3C, 3E:
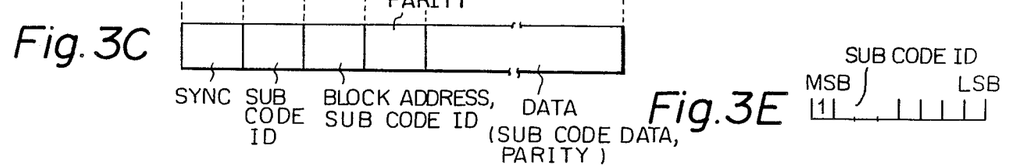

FIG. 3C shows a data constitution of one block of the sub codes. The data constitution is similar to that of the foregoing PCM block. As shown in FIG. 3E, the most significant bit of the symbol $W_2$ of the sub code block is set to "1", thereby indicating that the block is the sub code block. The lower four bits of the symbol $W_2$ are used as the block address. Eight bits of the symbol $W_1$ and three bits in the symbol $W_2$ excluding the MSB and the block address in the symbol $W_2$ are used as the sub code ID. A simple parity error correction coding process is executed with regard to two symbols ($W_1$ and $W_2$) of the sub code block and a parity of eight bits is added.

Figure 4A:
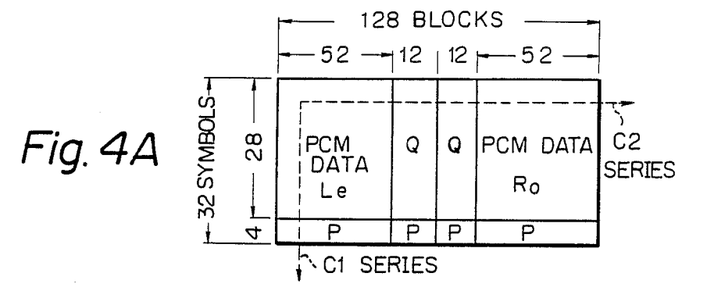
FIGS. 4A and 4B are schematic diagrams for explaining error correction codes of the digital tape recorder.
Figure 4B:
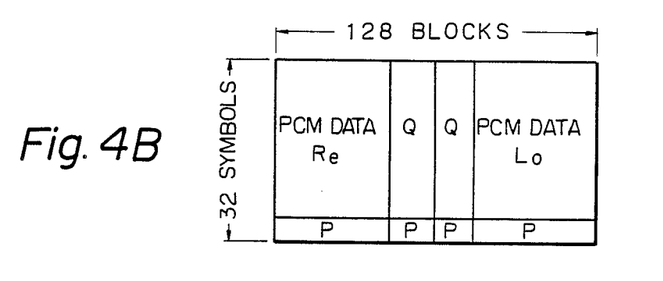

The data of the sub code ID which is recorded in the even number designated block addresses (the LSB (least significant bit) of the block address is "0") differs from the data of the sub code ID which is recorded in the odd number designated block addresses (the LSB of the block address is "1"). The sub code ID includes the control ID, time code, and the like to designate the reproducing method. The sub code data is subjected to the error correction coding process by the Reed Solomon code similarly to the PCM data.

c. Error correction codes of a digital tape recorder:

The processes of the error detection/correction codes are executed for the data of each one of the 128 blocks to be recorded in one segment. FIG. 4A shows a code constitution of the data to be recorded by the magnetic head 2A. FIG. 4B shows a code constitution of the data to be recorded by the other magnetic head 2B. The PCM signal in which the number of digitization bits is sixteen is divided into an upper eight bits and a lower eight bits, and the coding processes of the error detection/correction codes are performed in a manner such that eight bits are used as one symbol.

The data of 4096 ($=128 \times 32$) symbols is recorded in one segment. As shown in FIG. 4A, the $C_1$ and $C_2$ error correction coding processes are executed with respect to each of the vertical and horizontal directions of the two-dimensional arrangement of the data consisting of the even-number designated data Le of the L channel comprising the symbols of ($L_0, L_2, \ldots, L_{1438}$) and the odd-number designated data Ro of the R channel comprising the symbols of ($R_1, R_3, \ldots, R_{1439}$). A $C_1$ coding process using a Reed Solomon code of (32, 28, 5) is performed with regard to the twenty-eight symbols in the vertical direction. The parity data P of four symbols of the $C_1$ code is arranged at the last position of the two-dimensional arrangement. A $C_2$ coding process using a Reed Solomon code of (32, 26, 7) is performed with regard to the fifty-two symbols in the horizontal direction. The coding process of the $C_2$ code is executed with respect to the twenty-six symbol pairs of every two symbols among the fifty-two symbols. The parity data Q consisting of six symbols is generated with respect to one code series. The parity data Q consisting of a total of twelve symbols of the $C_2$ code is arranged in the central portion of the two-dimensional arrangement. The parity data Q consisting of six symbols is generated with respect to one code series. The parity data Q consisting of a total of twelve symbols of the $C_2$ code is arranged in the central portion of the two-dimensional arrangement. Similarly, the $C_2$ coding process is also executed with regard to the symbols of the other 52 PCM data in the horizontal direction and the parity data Q is arranged in the central portion.

The code constitution shown in FIG. 4B is obtained by replacing the even-number designated PCM signals of the L channel in the code constitution shown in FIG. 4A by the even-number designated PCM signals ($R_0, R_2, \ldots, R_{1438}$) of the R channel and by replacing the odd-number designated PCM signals of the R channel by the odd-number designated PCM signals ($L_1, L_3, \ldots, L_{1439}$) of the L channel.

Figure 5:
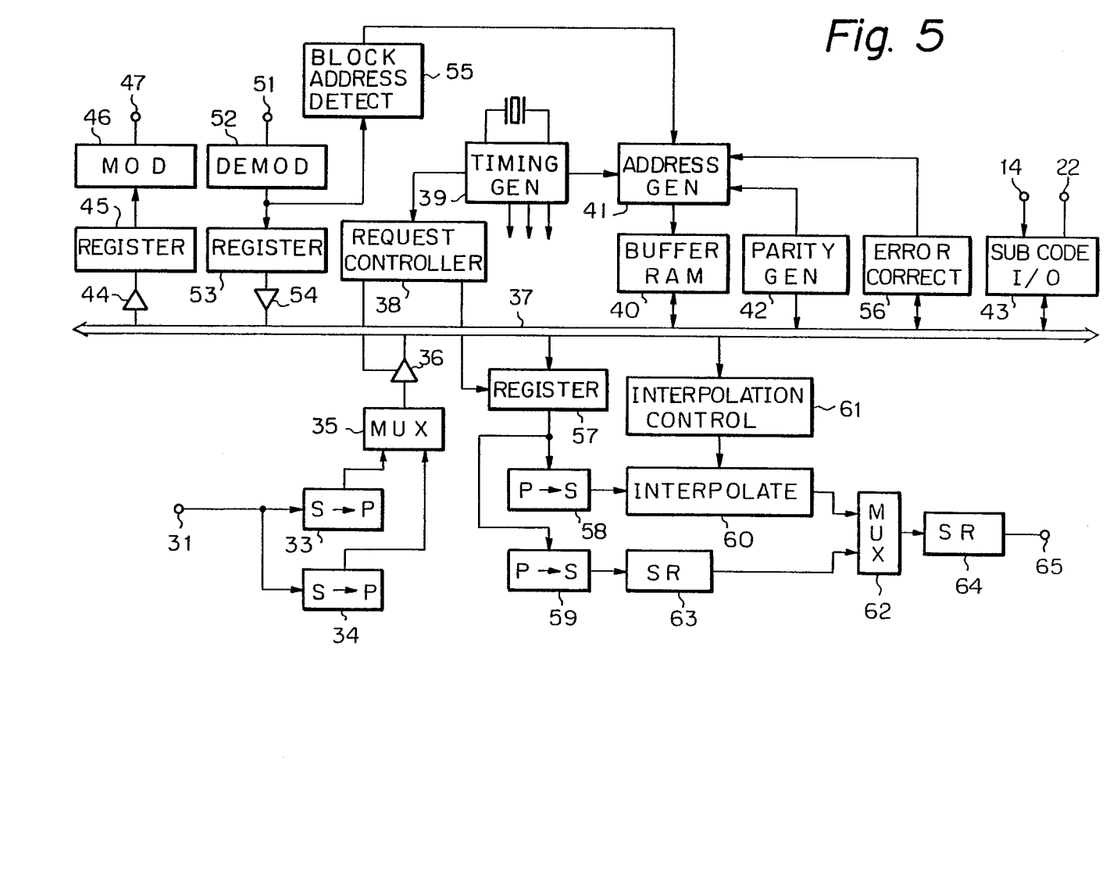
FIG. 5 is a block diagram of the main section of an embodiment of the invention.

As shown in FIG. 3B, one PCM block is constituted by adding the sync signal, PCM-ID, block address, and parity to the 32 symbols arranged in the vertical direction in those code constitutions.

d. Recording signal processor and reproduction signal processor according to the present invention:

Digital input data can be supplied to the recording signal processor 13 in the foregoing digital tape recorder separately from the analog audio signal supplied to the input terminal 10. Also digital output data can be derived from the reproduction signal processor 18 separately from the reproduced audio signal taken out to the output terminal 21. The reason for separately deriving the digital output data is to digitally connect the digital tape recorder with another PCM apparatus in order to perform digital dubbing or the like. The present invention is applied to the generation of the foregoing serial data.

FIG. 5 shows a constitution of the recording signal processor and reproduction signal processor of the apparatus of the present invention. In FIG. 5, the PCM signal from the A/D converter 12 or serial data from another digital tape recorder, digital mixer, or the like is supplied to an input terminal 31. The input digital signal is supplied to series/parallel converters 33 and 34 which are constituted by shift registers. The PCM signal is separated by the series/parallel converter 33 and the sub codes are separated by the other series/parallel converter 34. The PCM signal in which one sample consists of sixteen bits is divided into the upper eight bits and the lower eight bits. The error correction coding process and digital modulating process are executed for each eight bit symbol. One symbol of the sub codes consists of eight bits. The eight-bit parallel data is supplied from each of the series/parallel converters 33 and 34 to a data bus 37 through a multiplexer 35 and a buffer 36.

The buffer 36 is controlled by a control signal from a request controller 38 and is set into the active state at a predetermined timing. A request signal is supplied from a crystal controlled timing generator 39 to the request controller 38. The timing generator 39 generates not only the request signal but also clock signals comprised of a bit clock BCK, a word clock WCK, and a clock LRCK for identifying the L (left) or R (right) channel, and a control signal. The input data transmitted from the data bus 37 is written into a buffer RAM 40. An address to write the input data into the buffer RAM 40 is formed by an address generator 41. The address generator 41 produces a write address using the clocks from the timing generator 39. The data stored in the buffer RAM 40 is supplied to a parity generator 42 through the data bus 37 in accordance with a predetermined order. In the parity generator 42, a parity P of the error correction code $C_1$ and a parity Q of the error correction code $C_2$ are generated with respect to the PCM signal to be recorded in one segment. The sub codes are also subjected to the error correction coding process in the parity generator 42. The produced parity symbols are written into the buffer RAM 40 through the data bus 37. The addresses necessary to produce the parity symbols are generated from the address generator 41. The parity generator 42 supplies timing signals indicative of the starts of the $C_1$ and $C_2$ coding processes to the address generator 41.

A sub code I/O circuit 43 is connected to the data bus 37. The sub codes from the input terminal 14 are written into the buffer RAM 40 through the sub code I/O circuit 43 and data bus 37. The error correction coded PCM signal and the sub codes are supplied to a register 45 through a buffer 44. The output signal of the register 45 is supplied to a modulator 46. The modulator 46 converts eight bit symbols into ten bit patterns. The low frequency components in the recording data which is taken out from the modulator 46 to an output terminal 47 are reduced by the digital modulation, so that no waveform distortion is caused and the digital signal from which the clocks can be easily extracted on the reproduction side is obtained.

The reproduced signal from an input terminal 51 is supplied to a demodulator 52 and one symbol and ten bits are demodulated into one symbol and eight bits. The reproduced data from the demodulator 52 is supplied symbol by symbol to the data bus 37 through a register 53 and a buffer 54.

The buffer RAM 40 and an error correcting circuit 56 are connected to the data bus 37. The reproduced data is stored into the buffer RAM 40 from the data bus 37. In the error correcting circuit 56, the data stored in the buffer RAM 40 is subjected to the error correcting processes ($C_1$ decoding and $C_2$ decoding) by use of Reed Solomon codes. The error corrected PCM signal and the sub codes are read out of the buffer RAM 40 and supplied to a register 57 through the data bus 37. The register 57 is controlled by the control signal from the request controller 38.

A block address detecting circuit 55 is provided in conjunction with the demodulator 52. The reproduction block address is detected by the block address detecting circuit 55. The reproduction block address is supplied to the address generator 41. The reproduction address generated from the address generator 41 is set to the address signal of the buffer RAM 40. The reproduction block address is used to write the reproduced data of one segment (32 symbols × 128 blocks) (refer to FIG. 4) for each block in the order from the first block to the 128th block.

The address for the ECC (error correcting circuit) is also produced by the address generator 41. The ECC address is supplied to the buffer RAM 40. The ECC address is used to read out the data from the buffer RAM 40 for the respective $C_1$ and $C_2$ decoding processes and to write the error corrected data and pointers into the buffer RAM 40. The timing signals indicative of the start timings of the respective $C_1$ and $C_2$ decoding processes are supplied from the error correcting circuit 56 to the address generator 41.

The PCM signals which were subjected to the $C_1$ and $C_2$ decoding processes and the error corrected sub codes are read out of the buffer RAM 40. In this case, the stereophonic signals of two channels are formed by the PCM signals which had been reproduced from two tracks of the interleave pair and which were error corrected. In order to read out the error corrected PCM signal from the buffer RAM 40, the addresses formed by the address generator 41 are supplied to the buffer RAM 40. The PCM signal and sub codes which were read out of the buffer RAM 40 are supplied to the register 57. The reproduced sub codes are supplied to a system controller (not shown) through the sub code I/O circuit 43.

Parallel/series converters 58 and 59 are connected to the register 57. The PCM signal is supplied to the parallel/series converter 58 and the sub codes are supplied to the parallel/series converter 59. The serial data PCM signal, as converted by the parallel/series converter 58, is supplied to an interpolating circuit 60 where the uncorrectable errors are interpolated. The output signal of the interpolating circuit 60 is supplied to a multiplexer 62. The operation of the interpolating circuit 60 is controlled by a control signal from an interpolation control circuit 61. In the interpolating circuit 60, the words of the PCM signal whose errors could not be corrected are interpolated by a previous value holding process, an average value interpolating process, or the like. The PCM signal from the interpolating circuit 60 is supplied to the multiplexer 62.

The sub codes from the parallel/series converter 59 are delayed by a shift register 63 and supplied to the multiplexer 62. The shift register 63 is provided to delay the input signal from the converter 59. The output signal of the multiplexer 62 is taken out to a digital output terminal 65 through a shift register 64. The PCM signal or the serial data in which the PCM signal and the sub data are mixed as will be explained hereinafter is supplied to a digital output terminal 65.

e. Data transferring system according to the present invention:

The serial data which is input from the digital input terminal 31 or output from the digital output terminal 65 in the foregoing recording signal processor and reproduction signal processor will now be described.

Figures 6A, 6B:
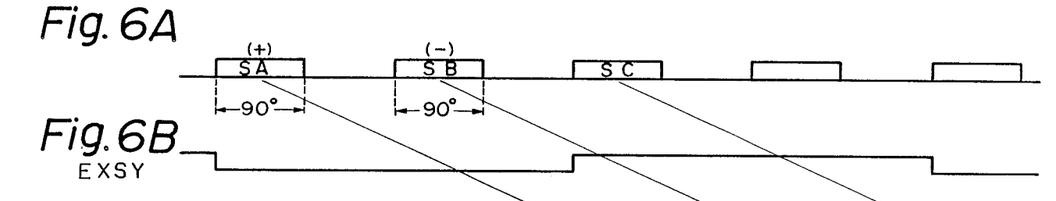
FIGS. 6A through 6C and 7A through C are time charts for explaining the reproducing and recording modes of transmission data.

FIG. 6A shows the reproduced RF signal which was alternately reproduced by the magnetic heads 2A and 2B. The reproduced RF signal is reproduced within a range of the rotational angle of 90°. In FIG. 6A, (+) and (−) denote the azimuths (+azimuth and −azimuth) of the gaps of the respective magnetic heads 2A and 2B. SA, SB, and SC indicate the sub data (sub codes, sub code ID, and PCM-ID) included in the reproduced RF signal of each segment. An output sync signal EXSY, synchronized with the rotation of the magnetic heads 2A and 2B and shown in FIG. 6B, is formed by rotation detectors provided in conjunction with the magnetic heads.

Figures 6C, 7A, 7B:
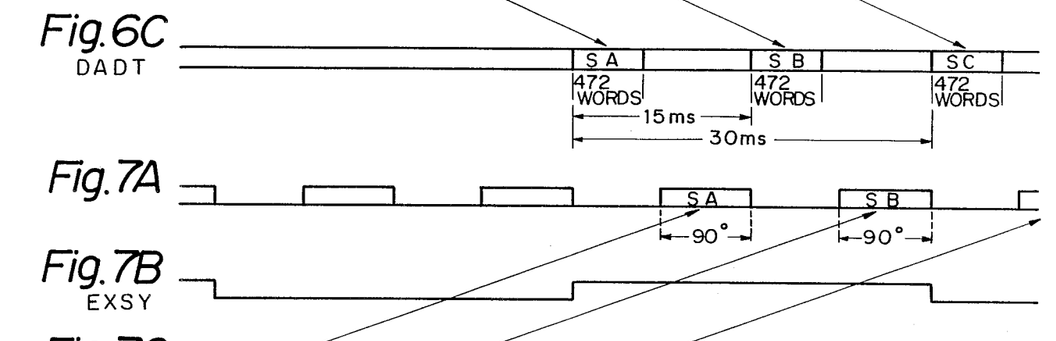
Figures 11A, 11B, 11C, 11D:
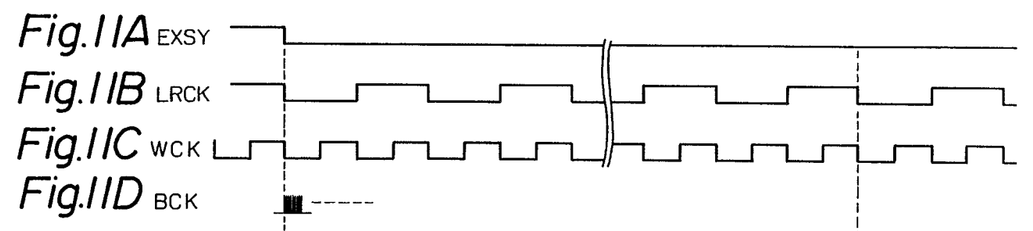
FIGS. 11A through 11J are time charts for explaining the transmission data.

The PCM signal and sub data SA and SB which were reproduced by the magnetic heads 2A and 2B are output as serial data DADT from the output terminal 65 during the period of time of the next rotation of the heads as shown in FIG. 6C. Since the rotational speeds of the magnetic heads 2A and 2B are 2000 r.p.m., it takes 30 msec for the magnetic heads to rotate once. The serial data DADT includes the PCM signal and sub data of one segment during every time slot of 15 msec. The sub data and PCM signal are time-divisionally or alternatively inserted during a period of time corresponding to 472 word clocks in a time slot of 15 msec as will be explained hereinafter and as shown in FIG. 11J. This inserting process is performed by the multiplexer 62.

Figure 7C:
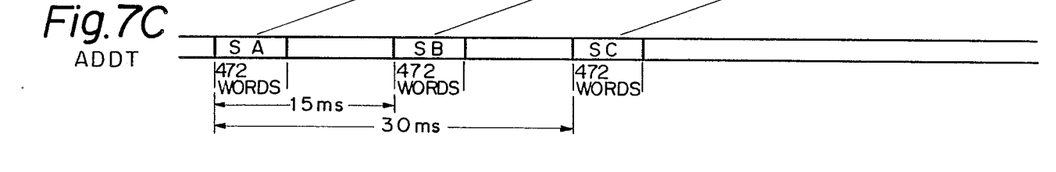

In the recording mode, the serial data ADDT shown in FIG. 7C is supplied to the digital input terminal 31. Similar to the serial data DADT shown in FIG. 6C, the serial data ADDT is the data in which the sub data and PCM signal were time-sharingly multiplexed for the period of time of 472 word clocks in the time slot of 15 msec. The serial data is synchronized with the output sync signal EXSY and separated into the PCM signal and the sub data by the serial/parallel converters 33 and 34.

The PCM signal and sub data which were separated from the serial data are subjected to the error correcting process and the like, respectively. Thereafter, they are supplied as the recording signals shown in FIG. 7A to the magnetic heads 2A and 2B. There is a time deviation of one rotation of the magnetic heads 2A and 2B between the recording signal and the input serial data.

Figure 8:
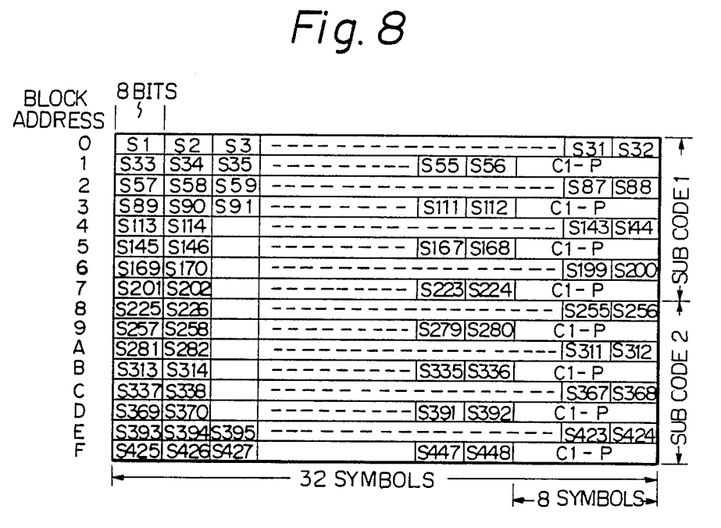
FIGS. 8 to 10 are schematic diagrams for explaining the sub data.

The sub data included in one segment which is recorded in each track will now be described with reference to FIGS. 8 to 10. FIG. 8 shows the sub code data. The sub code data $S_1$ to $S_{448}$ each consisting of eight bits are arranged in a matrix form. The error correction coding process by use of a Reed Solomon code of (32, 28, 5) is executed for every sub code data of twenty-eight symbols. This error correction code is the same as the error correction code $C_1$ which is applied to the PCM signal. The parity data $C_1$-P of eight symbols included in two code series are collectively arranged. The sub code data and parity data $C_1$-P are inserted into the respective block addresses of (0 to F) (hexadecimal notation). The data included in eight block addresses of (0 to 7) is set to the sub code 1. The data included in eight blook addresses of (8 to F) is set to the sub code 2. The sub codes 1 and 2 are recorded into the different recording areas of the same track for every block address.

Figure 9:
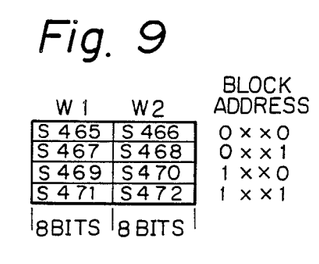

The data shown in FIG. 9 is recorded in the sub code ID in the sub code block. The sub code data $S_{465}$ and $S_{466}$ are recorded as $W_1$ and $W_2$ in the sub code blocks whose block addresses are (0x×0) (where, x=0 or 1), namely, (0, 2, 4, 6). The sub code data $S_{467}$ and $S_{468}$ are recorded as $W_1$ and $W_2$ in the sub code blocks 7). The sub code data $S_{469}$ and $S_{470}$ are recorded in the sub code blocks whose block addresses are (1x×0), i.e., (8, A, C, E). The sub code data $S_{471}$ and $S_{472}$ are recorded in the sub code blocks whose block addresses are (1x×1), i.e., (9, B, D, F). The four-bit block addresses are also included in the sub code data $S_{466}$, $S_{468}$, $S_{470}$, and $S_{472}$, respectively. The time code information and control information of the reproducing operation are included in the sub code ID.

Figure 10:
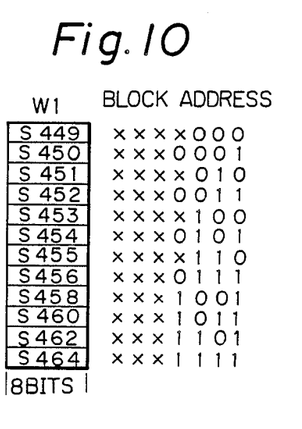

The PCM-ID shown in FIG. 10 is recorded as the PCM-ID ($W_1$) in the PCM block. The data $S_{449}$ which is recorded into the PCM block of the block address whose lower three bits are (000) includes $ID_1$ (two bits) and $ID_2$ (two bits) of the ID code and the frame address (four bits). The data $S_{451}$ which is recorded into the PCM block of the block address whose lower three bits are (010) includes $ID_3$ (two bits), $ID_4$ (two bits), and frame address (four bits). The data $S_{453}$ which is recorded into the PCM block of the block address whose lower three bits are (100) includes $ID_5$ (two bits), $ID_6$ (two bits), and frame address (four bits). The data $S_{455}$ which is recorded into the PCM block of the block address whose lower three bits are (110) includes $ID_7$ (two bits), $ID_8$ (two bits), and frame address (four bits). The presence or absence and the characteristic of the emphasis, the sampling frequency, the number of digitization bits, the tape speed, and the like with respect to the recorded PCM signal are identified on the basis of eight ID codes of $ID_1$ to $ID_8$. The frame addresses regarding the interleave pair are set to the same code.

The symbols $S_{450}$, $S_{452}$, $S_{454}$, $S_{456}$, $S_{458}$, $S_{460}$, $S_{462}$, and $S_{464}$ other than the foregoing symbols of the PCM-ID are the optional codes and are not defined by the standards. Further, $S_{457}$, $S_{459}$, $S_{461}$, and $S_{463}$ are the codes which are not defined at all.

The sub data (total 472 symbols/one segment) including the foregoing sub code data, sub code ID, and PCM-ID, is inserted for the first period of time of 472 word clocks in 15 msec of the serial data which is input and output. Each of SA, SB, and SC in FIGS. 6 and 7 is the sub data.

The arrangements of the sub codes in the serial data DADT and ADDT will now be described with reference to FIG. 11. FIG. 11A indicates the output sync signal EXSY whose level is inverted every 30 msec synchronously with the rotation of the rotary heads 2A and 2B. FIG. 11B shows the clock LRCK to identify the L and R channels. FIG. 11C represents the word clock WCK of the PCM signal. FIG. 11D indicates the bit clock BCK of the PCM signal. One word of the PCM signal consists of sixteen bits and one symbol of the sub data consists of eight bits.

In the period of time of 472 word clocks from the edge of the output sync signal EXSY, the words ($L_0$, $R_0$, $L_1$, $R_1$, . . . , $L_{235}$, $R_{235}$) of the PCM signal are inserted for the period of time when the word clock WCK is set to "1". On the other hand, the sub data ($S_1$, $S_2$, $S_3$, $S_4$, $S_{471}$, $S_{472}$) is inserted for the period of time of eight bit clocks in the latter half of the period of time when the word clock WCK is set to "0", respectively. Only the PCM signal is inserted for the period of time after the period of time of 472 word clocks.

Figures 11E, 11F:
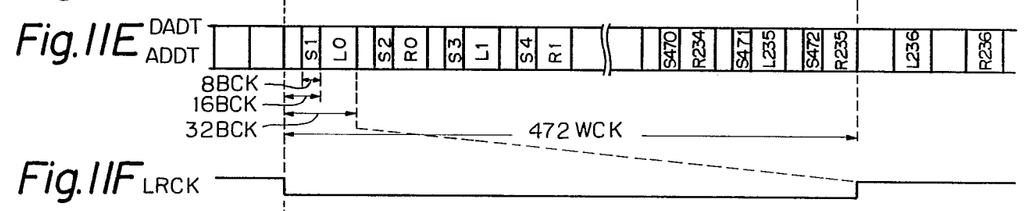
Figure 11G:
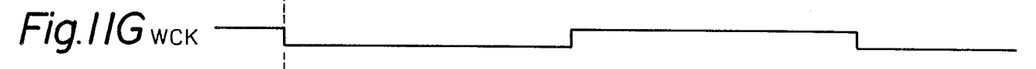
Figure 11H:
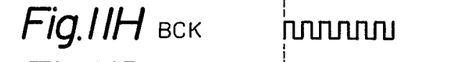
Figure 11I:
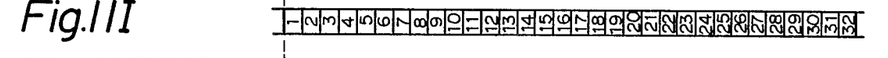
Figure 11J:
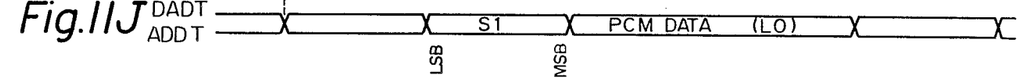

FIGS. 11F to 11J show time charts in which the time base of the period of time of thirty-two bit clocks is enlarged. The PCM signal of the L channel is inserted for the period of time when the clock LRCK shown in FIG. 11F is set to "0". The period of time of thirty-two bit clocks BCK shown in FIG. 11H is included in one period of time of the word clock WCK shown in FIG. 11G. As shown in FIG. 11I, the bit numbers of thirty-two bits are define by the bit clock BCK. As shown in FIG. 11J, the PCM signal ($L_0$) of sixteen bits is located from the 17th bit to the 32nd bit. The sub code $S_1$ is located from the ninth bit to the sixteenth bit.

In a rotary head type digital tape recorder, the sampling frequency is not limited to 48 kHz but may be also set to 32 or 44.1 kHz. Therefore, the number of words of the PCM signal included in one segment changes. However, the sub data is inserted into the serial data DADT or ADDT for the first period of time of 472 word clocks of the time slot of every 15 msec similar to the case where the sampling frequency is 48 kHz. The data blank interval of eight bit clocks is included in the period of time of thirty-two bit clocks when the PCM signal of one word and the sub data of one symbol are inserted. An auxiliary bit indicative of valid or invalid data or a bit which can be specified by the user may be also inserted for the data blank interval as shown in FIG. 11E.

According to the present invention, a large amount of sub data in the rotary head type digital tape recorder can be inserted into the serial data which is input and output, and the sub data does not need to be transmitted by another channel.

Although the present invention has been shown and described with respect to a preferred embodiment, various changes and modifications which are obvious to a person skilled in the art to which the invention pertains are deemed to lie within the spirit and scope of the invention.

What is claimed is:

1. A method of transmitting a digital signal, inclduing a PCM signal and sub data representing control data, reproduced by a tape recorder having rotary heads, comprising the steps of:
deriving the PCM signal from the sigal reproduced by the rotary heads;
deriving the sub data from the signal reproduced by the rotary heads; and
serially transmitting each of a predetermined number of words of the reproduced PCM signal and each symbol of the reproduced sub data as a pair synchronously with the rotation of the rotary heads.

2. A method of trnsmitting a digital signal, including a PCM signal and sub data concered with said PCM signal, reproduced by a tape rcorder having rotary heads, wherein a word of said PCM siganl corresponds to one digital data sampling of an analog signal, comprising the steps of:
deriving the PCM signal from the signal reproduced by the rotary heads;
deriving the sub data from the signal reprodued by the rotary heads; and
serially transmitting each of a predetermined number of words of the reproduced PCM siganl and each symbol of the reproduced sub data as a pair synchronously with the rotation of the rotary heads.

3. A method of transmitting a digital signal, including a PCM signal and sub data concerned with said PCC signal, reproduced by a tape recorder having rotary heads, wherein said sub data includes an additional signal added to the PCM signal block recorded in a predetermined area on a tape and a sub code signal recorded in another area on the tape different from said predetermined area in which the PCM signal block was recorded, comprising the steps of:
deriving the PCM signal from the signal reprouuced by the rotary heads;
deriving the sub data from the signal reproduced by the rotary heads; and
serially transmitting each of a predetermined number of words of the reproduced PCM signal and each symbol of the reproduced sub data as a pair synchronously with the rotation of the rotary heads.

4. A method of trnasmitting a digital signal, including a PCM signal and sub data concerned with said PCM signal, reproduced by a tape recorder having rotary heads, comprising the steps of:
deriving the PCM signal from the signal reproduced by the rotary heads;
deriving the sub data from the signal reproduced by the rotary heads; and
serially transmitting each of a predetermined number of words of the reproduced PCM signal and each symbol of the reproduced sub data as a pair synchronously with the rotation of the rotary heads for a prodetermined period of time which is equal to the scanning interval of the rotary heads.

5. The method according to claim 4 wherein for the period of time corresponding to a predetermined number of words (472) within said predetermined period of time, each symbol (eight bits) of the sub data is transmitted as a pair with each word (sixteen bits) of the PCM signal, whereby 472 symbols can be input and output as serial data together with the PCM signal.

6. A method of receiving a digital signal, inclduing a PCM signal and sub data representing control data, to be recorded by a tape recorder having rotary heads, comprising the steps of:
serially receiving each of a predetermined number of words of the PCM signal to be recorded and each symbol opf the sub data as a pair synchronously with the rotation of the rotary heads;
coding the received PCM signal for error corrections;
recording the coded PCM signal into a predetermined area on a tape by the rotary heads;
coding the received sub data for error corrections; and
recording the coded sub data into another area on the tape different from said predetermined area in which the coded PCM signal was recorded by the rotary heads.

7. An apparatus for transmitting a digital signal, including a PCM signal and sub data concerned with said PCM signal, reproduced by a tape recorder having rotary heads, said apparatus comprising:
first decoding means for correcting errors of the PCM signal in the signal reproduced by the rotary heads;
second decoding means for correcting errors of the sub data in the signal reproduced by teh rotary heads;
means for arranging respectve words of the decoded PCM signal at predetermined regular intervals;
means for forming as pairs each symbol of the decoded sub data with each of a predetermined number of words of the decoded PCM signal synchronously with the rotation of said rotary heads; and
means for serially transmitting said pairs of each word of the PCM signal with each symbol of the sub data.

8. An apparatus according to claim 7, wherein the word of said PCM signal corresponds to one digital data sampling of an analog signal.

9. An apparatus according to claim 7, wherein said sub data includes an additional signal added to the PCM signal block recorded on a tape and a sub code signal recorded in another area on the tape different from the area in which the PCM signal block was recorded.

10. An apparatus for receiving a digital signal, including a PCM signal and sub data concerned with said PCM signal, to be recorded by a tape recorder having rotary heads, comprising:

means for serially receiving as pairs, synchronously with the rotation of said rotary heads, each of a predetermined number of words of the PCM signal to be recorded with each symbol of the sub data;

means for separating the PCM signal and the sub data;

first coding means for performing a coding process for error correction of the separated PCM signal;

second coding means for performing a coding process for error correction of the separated sub data; and means for recording the PCM signal and the sub data on a tape synchronously with the rotation of the rotary heads.

* * * * *